United States Patent [19]
Reuter et al.

[11] Patent Number: 5,702,150
[45] Date of Patent: Dec. 30, 1997

[54] WIND DEFLECTING DEVICE FOR A CONVERTIBLE

[75] Inventors: Dieter Reuter, Ehningen; Jens Quittenbaum, Wiernsheim, both of Germany

[73] Assignee: Dr. Ing. h.c.F. Porsche AG, Weissach, Germany

[21] Appl. No.: 709,676

[22] Filed: Sep. 9, 1996

[30] Foreign Application Priority Data

Sep. 9, 1995 [DE] Germany ................ 195 34 584.3

[51] Int. Cl.$^6$ ........................................ B62D 35/00
[52] U.S. Cl. .................. 296/180.1; 296/85; 280/756
[58] Field of Search .................... 296/180.1, 85; 280/756

[56] References Cited

U.S. PATENT DOCUMENTS

| 5,236,219 | 8/1993 | Jambor et al. | 280/756 |
| 5,318,337 | 6/1994 | Gotz et al. | 296/180.1 X |

FOREIGN PATENT DOCUMENTS

| 0233777A2 | 8/1987 | European Pat. Off. . | |
| 85 23 831.7 | 11/1985 | Germany . | |
| 8523831 U | 11/1985 | Germany . | |
| 35 37 644 C1 | 4/1987 | Germany . | |
| 91 11 779.8 | 4/1992 | Germany . | |
| 9204439 U | 7/1992 | Germany . | |
| 4119529 | 12/1992 | Germany | 296/180.1 |
| 4119530 | 12/1992 | Germany | 296/180.1 |
| 4239428 | 3/1994 | Germany | 296/180.1 |
| 4239428A1 | 3/1994 | Germany . | |

OTHER PUBLICATIONS

Search Report, Nov. 7, 1996, Germany.
Patent Office Statement of Examination, Apr. 16, 1996, Germany.

*Primary Examiner*—Joseph D. Pape
*Attorney, Agent, or Firm*—Evenson McKeown Edwards & Lenahan, PLLC

[57] ABSTRACT

A convertible has a stationary rollover bar on which a wind deflecting device can be fixed. In order to ensure, on the one hand, a good operation of the rollover bar and the wind deflecting device and, on the other hand, to not negatively influence the stylistic overall appearance of an open vehicle as a result of the rollover bar and the wind deflecting device, it is provided that the rollover bar comprises a tube section which extends approximately at the level of the belt line and in the transverse direction of the vehicle, bar sections which project upwards in laterally exterior areas leading away from the tube section. The wind deflecting device is composed of a center part and two lateral parts, the lateral part being inserted into the openings of the bar sections and the center part being inserted into the cutout of the rollover bar bounded by the bar sections and the transversely extending tube section.

22 Claims, 3 Drawing Sheets

WIND DEFLECTING DEVICE FOR A CONVERTIBLE

BACKGROUND AND SUMMARY OF THE INVENTION

This invention relates to a wind deflecting device for a convertible having a stationary rollover bar, the wind deflecting device in its upright operating position being fixable on the rollover bar.

From German Patent Document DE-GM 91 11 779, a convertible is known which is provided with a stationary rollover bar behind the front seats. The rollover bar spans the passenger compartment in a curved manner from one side of the body to the opposite side. A large-surface upright wind deflecting device is fastened to the rollover bar above a belt line and is formed by a downwardly open frame which is covered with fabric. Such rollover bars and large-surface wind deflecting devices impair the stylistic appearance of an open vehicle.

German Patent Document DE 35 37 644 C1 also shows a convertible with a stationary rollover bar and a wind deflecting device, the wind deflecting device comprising a standing pane which is locally supported on the rollover bar. The disk extends only along a partial area of the height of the rollover bar. German Patent Document DE-GM 85 23 831 relates to a stationary rollover bar for a two-seat open motor vehicle which has two projecting bar sections above a transversely extending connecting rod. No wind deflecting device is provided in this arrangement.

It is an object of the invention to take such measures on a rollover bar provided with a wind deflecting device that, on the one hand, a good operation of the rollover bar and the wind deflecting device is ensured and that, on the other hand, the stylistic appearance of the open vehicle is positively influenced by the rollover bar and the wind deflecting device.

According to the invention, this object is achieved by an arrangement wherein the rollover bar comprises a tube section which extends approximately at the level of the belt line and in the transverse direction of the vehicle, upwardly projecting bar sections in laterally exterior areas leading away from the tube section, and wherein the wind deflecting device is composed of a center part and two lateral parts, the lateral parts being inserted into the openings of the bar sections and the center part being inserted into the cutout of the rollover bar which is bounded by the bar sections and the transversely extending tube section.

Principal advantages achieved by means of the invention are that the rollover bar which has pulled-up bar sections only in lateral exterior areas, in addition to a good operation, also has a stylistically attractive appearance because it is unobtrusively integrated into the shaping of the vehicle. The wind deflecting device, which is composed of a center part and two lateral parts, can be fastened to the rollover bar in a simple manner and is also distinguished by a good operation. The center part is formed by a transparent, standingly arranged pane made of plastic which has a light weight and a scratch-resistant coating. By means of the frameless construction of the upper edge of the pane, this contour is not visible in the interior rear view mirror although it is situated in the viewing area of the interior rear view mirror. As the result of the transparent construction of the pane, the wind deflecting device has a disturbing effect neither when the top is open, nor when it is closed, so that it has to be demounted or folded down only very rarely.

By means of plug-type connections and/or a detent connection, the pane is releasably fastened to the rollover bar; that is, it can be removed as required. Because of its compact dimensions in comparison to conventional wind deflecting devices, the removed pane can easily be stored in the vehicle. The lateral parts, which are formed by plastic injection-molded grids or by perforated plates equipped with a frame, and have a grid structure are buckled toward the rear so that the rear seat backrest or the headrest of the front seat can project into the space of the bar sections, whereby the adjusting range of the seat or of the backrest is expanded.

By means of clipped connections or the like, the lateral parts can be inserted from the rear into the openings of the bar sections.

Other objects, advantages and novel features of the present invention will become apparent from the following detailed description of the invention when considered in conjunction with the accompanying drawings.

DETAILED DESCRIPTION OF THE DRAWINGS

Figure 1:
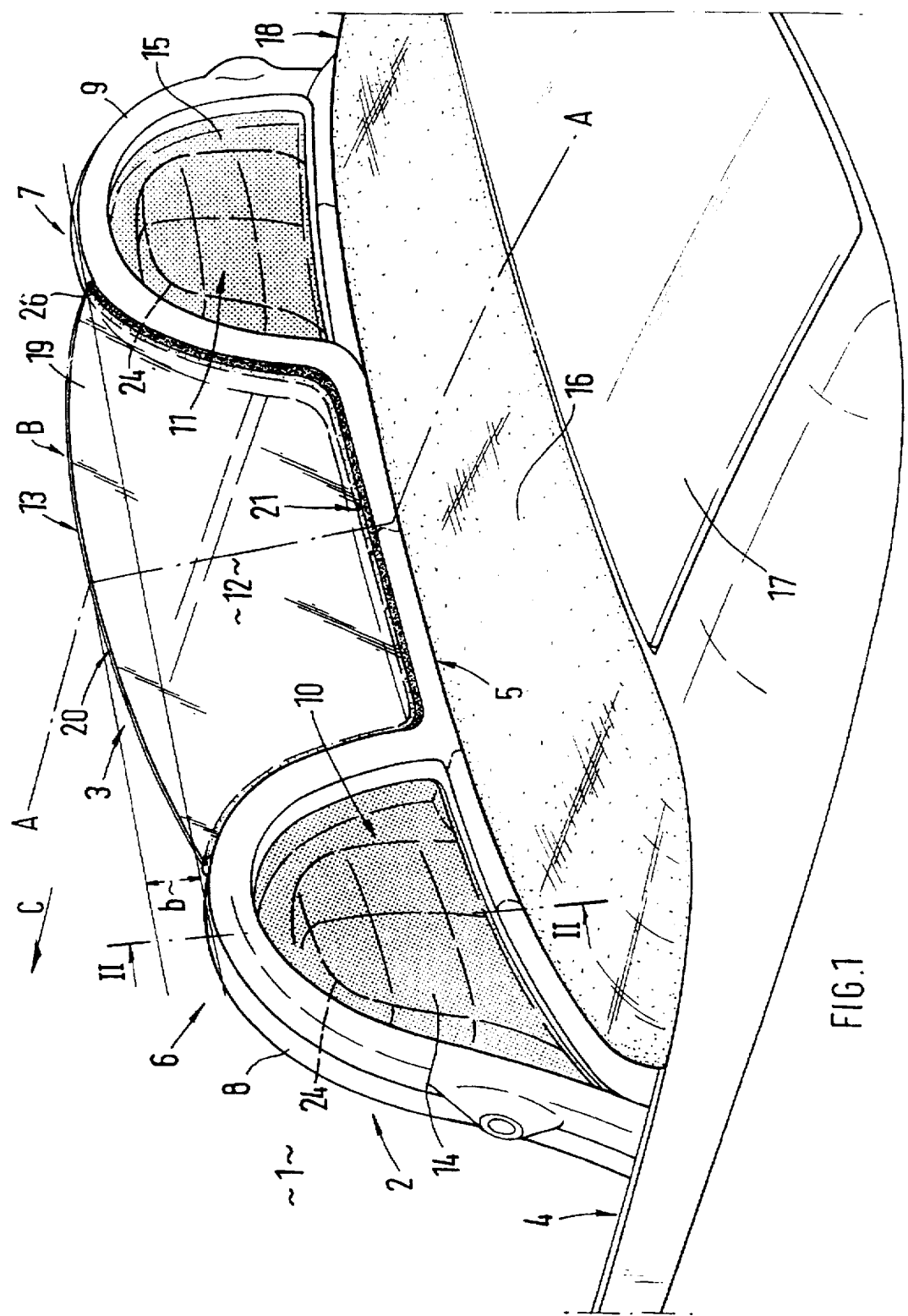
FIG. 1 is a perspective view from the rear of a rollover bar of an open vehicle (convertible) with a wind deflecting device mounted on the rollover bar, constructed according to a preferred embodiment of the invention.
Figure 2:
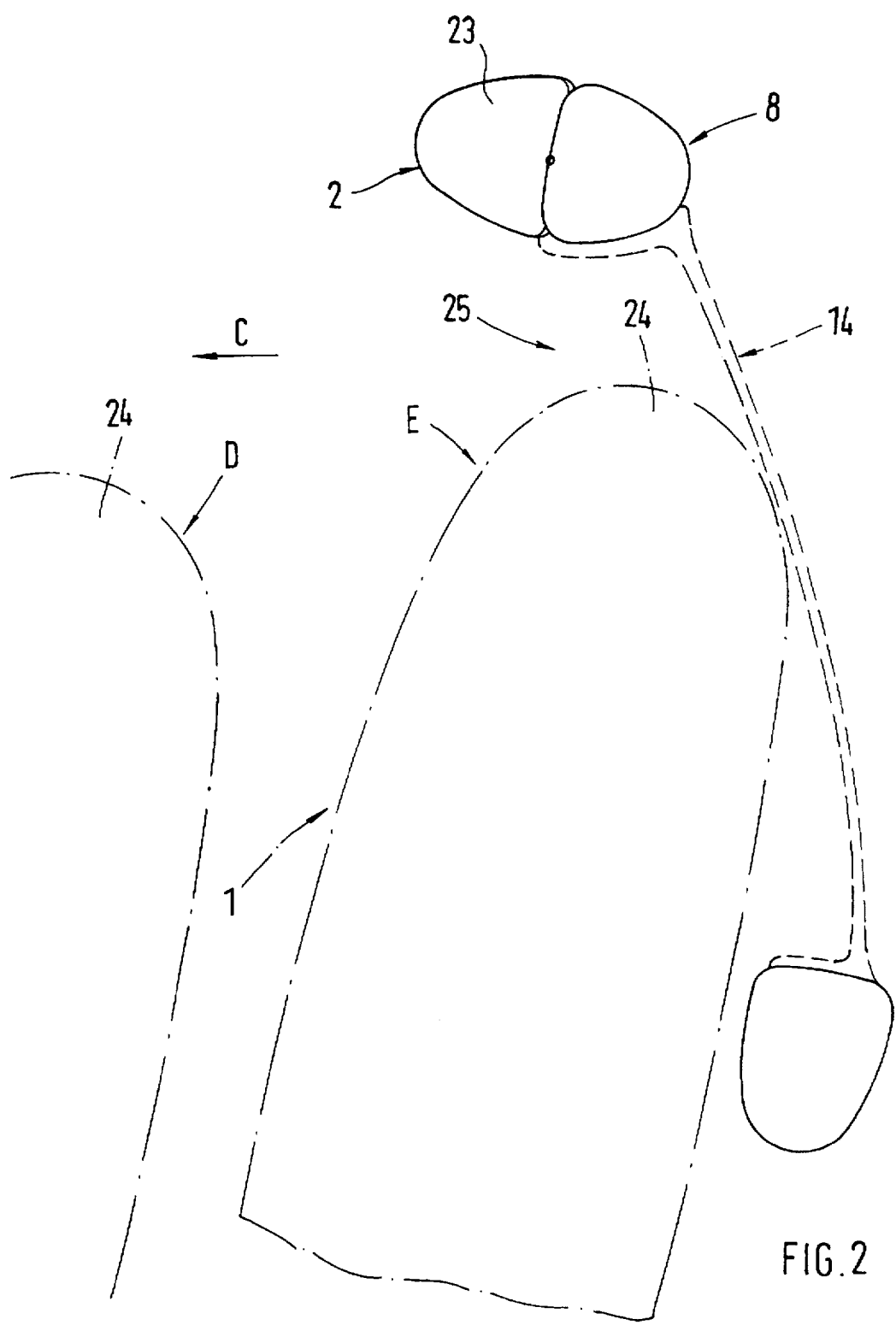
FIG. 2 is an enlarged sectional schematic view taken along to Line II—II of FIG. 1.

A two-seat open motor vehicle (convertible), which is not shown in detail, has a stationary rollover bar 2 behind the front seats 1, a wind deflecting device 3 being mounted on the rollover bar 2 by means of which the occupants situated in the front seats are protected from a disturbing air current flowing in from the rear (unpleasant draft phenomena in the head and neck area).

The rollover bar 2, which is fixed on the vehicle floor by way of upright supporting sections, has, approximately at the level of the belt line 4, at least one tube section 5 which extends in the transverse direction of the vehicle and which in the embodiment has a slightly curved shape. In lateral exterior areas 6, 7, two upwardly projecting bar sections 8, 9 lead away from the transversely extending tube section 5. Together with a partial area of the transversely extending tube section 5, each bar section 8, 9 bounds an opening 10, 11. The area of the bar sections 8, 9 which face the longitudinal center plane A—A of the vehicle and a center area of the tube section 5 define a cutout 12 of the rollover bar which is open in the upward direction.

The wind deflecting device 3 which extends in the upright direction is composed of a center part 13 and two lateral parts 14, 15, the lateral parts 14, 15 being inserted in the openings 10, 11 of the bar sections 8, 9 and the center part 13 being inserted into the section 12 of the rollover bar 2.

FIG. 1 shows the operating position B of the wind deflecting device 3, a forward, dimensionally stable top section 16 being disposed in front of the folding top compartment lid 17 and, in sections, forming a covering 18 of the folding top compartment which is situated underneath and is not shown.

By means of its forward end, the covering 18 extends to close to the transversely extending tube section 5 of the rollover bar 2. As required, the remaining gap between the lower edge of the tube section 5 and the upper boundary surface of the covering 18 can by closed off by an additional part.

The center part 13 is formed by a transparent, standingly arranged pane 19 which is releasably connected with the rollover bar 2. For reasons of weight, the pane 19 is preferably made of a suitable plastic (plexiglass), in which case the pane 19 can be provided with a scratch-resistant coating and/or a tinting. However, the pane 19 may also be made of glass. In the embodiment shown, the pane 19 has no openings. However, as an alternative, the pane may also be provided with a plurality of openings.

The upper, transversely extending edge 20 of the pane 19 has a frameless construction. As a result, it is ensured that edge 20 situated in the viewing area of the interior rear view mirror is not shown in the interior rear view mirror. The pane 19 is inserted into the recess 12 of the rollover bar 2 from above or from the rear and is fastened on the rollover bar 2, for example, by means of one or several plug-type connections 21.

Between the lower edge of the pane 19 and the transversely extending tube section 5, a releasable detent connection 22 can be provided for fixing the pane in the operating position B. As required, the pane 19 can be released rapidly and easily from the rollover bar 2 and can be stored in the vehicle. The pane 19 has relatively compact dimensions. On the lower edge of the pane 19 and/or on the two laterally exterior upright edges of the pane 19, a bordering frame 26 made of aluminum, plastic or rubber can be provided. On the edge side, the pane 19 is preferably clamped in between the rollover bar 2 and a covering 23 of the rollover bar 2. However, V-shaped receiving devices for inserting the pane 19 on the rollover bar 2 can also be provided.

In the front view, the upper edge 20 of the pane 19 has a curved construction, in which case the edge falls off slightly from the longitudinal center plane A—A of the vehicle toward the two bar sections 8, 9.

On the two upper exterior sides, the pane 19 extends approximately flush with or slightly lower than the upper boundary of the bar sections 8, 9. In the longitudinal center plane A—A of the vehicle, the pane 19 projects over the bar sections 8, 9 by an extent b.

In the embodiment shown, the two lateral parts 14, 15 are formed by plastic injection-molded grids or by perforated plates provided with a circumference-side frame and have a grid structure. The lateral parts 14, 15 can be fixed on the rollover bar 2 by means of a clipped connection, VELCRO fasteners, or the like. Advantageously, the lateral parts 14, 15 are arranged adjacent to a rear edge of the bar sections 8, 9 and are buckled against the driving direction C. As a result, it is achieved that an upper section 24 of the adjoining backrest of the seat 1 or of the headrest can project into the clearance 25 of the bar sections 8, 9, whereby the adjusting path of the seat 1 or of the backrest/headrest is enlarged. The seat 1 can therefore be displaced from a position D into a position E.

Like the center part 13, the lateral parts 14, 15 can also be made of plastic, glass or the like. Furthermore, the parts 13, 14, 15 of the wind deflecting device 3 can also be constructed as a flexible net, a textile fabric or the like.

Figure 3:
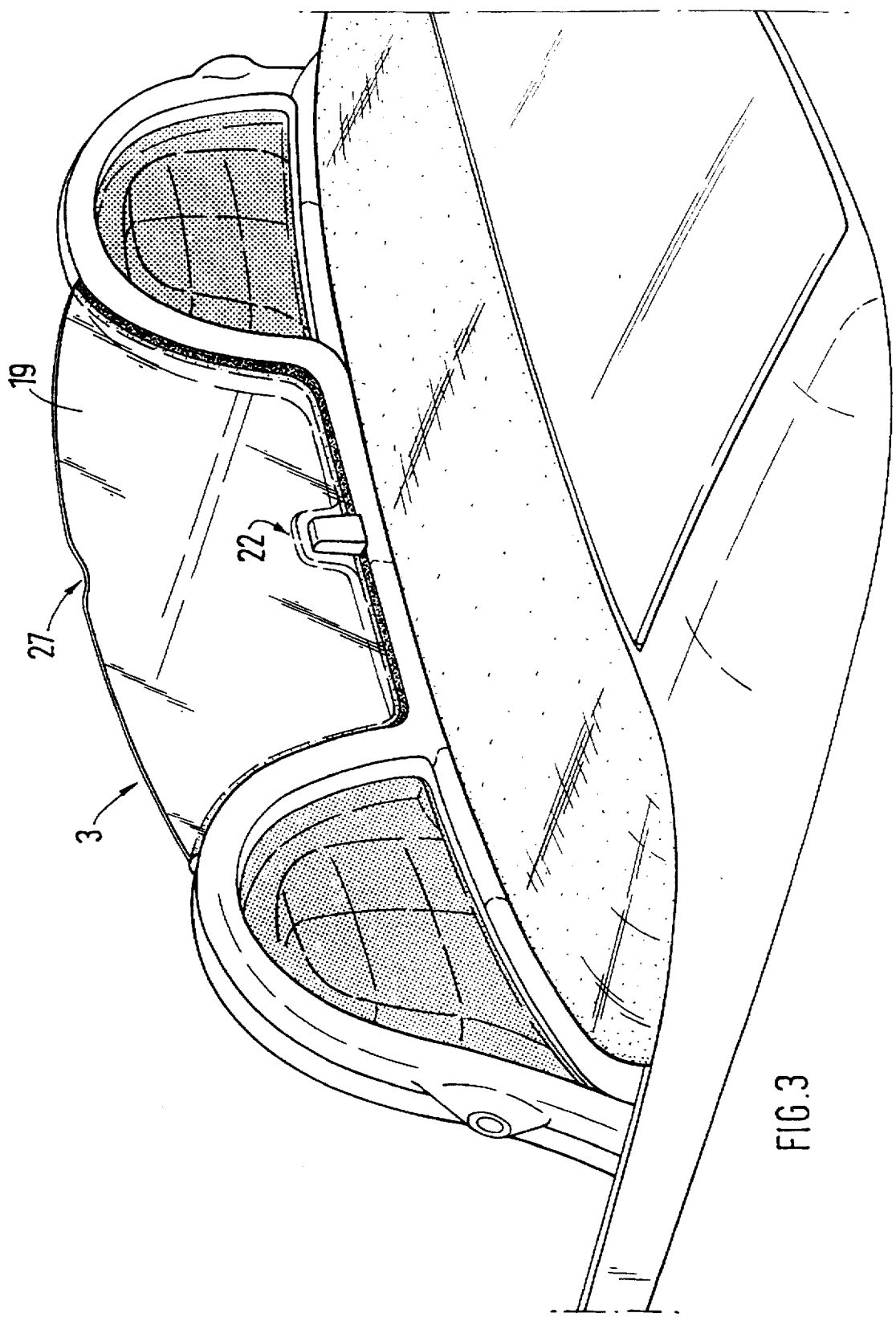
FIG. 3 is a view corresponding to FIG. 1 of another embodiment of the wind deflecting device.

FIG. 3 shows another embodiment of the wind deflecting device 3, in which a trough-shaped indentation 27 is provided on the pane 19 in a center area of the upper edge 20. Furthermore, the releasable detent connection between the underside of the pane 19 and the adjoining transversely extending tube section is illustrated schematically. The detent connection 22 is arranged on the side of the pane 19 facing away from the passenger compartment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Wind deflecting device for a convertible having a stationary rollover bar, the wind deflecting device in its upright operating position being fixable on the rollover bar, wherein the rollover bar comprises a tube section which extends approximately at a of the convertible belt line level, and in the transverse direction of the convertible, and upwardly projecting bar sections in laterally exterior areas leading away from the tube section, and wherein the wind deflecting device is composed of a center part and two lateral parts, the lateral parts being inserted into openings of the bar sections and the center part being inserted into a cutout of the rollover bar which is bounded by the bar sections and the transversely extending tube section.

2. Wind deflecting device according to claim 1, wherein the center part is formed by a transparent, standingly arranged pane made of plastic which is held in position on the rollover bar by means of at least one of a plug-type connection and detent connection.

3. Wind deflecting device according to claim 2, wherein the center part is constructed so it can be manually removed.

4. Wind deflecting device according to claim 2, wherein the upper transversely extending edge of the pane has a frameless construction.

5. Wind deflecting device according to claim 4, wherein the upper edge of the pane in the frontal view has a curved course, the upper edge slightly falling off from the longitudinal center plane of the convertible toward the two bar sections.

6. Wind deflecting device according to claim 5, wherein the lateral parts of the wind deflecting device are formed by plastic injection molded grids or perforated plates provided with a frame.

7. Wind deflecting device according to claim 6, wherein the lateral parts are buckled against the normal convertible forward driving direction in such a manner that an upper section of the adjoining backrest or of the headrest of the front seat can project into the clearance of the bar section.

8. Wind deflecting device according to claim 1, wherein the center part is constructed so it can be manually removed.

9. Wind deflecting device according to claim 1, wherein a bordering frame is provided along the lower edge.

10. Wind deflecting device according to claim 1, wherein the outer part includes a transparent pane, and wherein the upper edge of the pane, as viewed in a frontal view, has a curved course, the upper edge slightly falling off from the longitudinal center plane of the convertible toward the two bar sections.

11. Wind deflecting device according to claim 1, wherein the lateral parts of the wind deflecting device are formed by plastic injection molded grids or perforated plates provided with a frame.

12. Wind deflecting device according to claim 11, wherein the lateral parts are fixed on the rollover bar by means of a clipped connection.

13. Wind deflecting device according to claim 11, wherein the lateral parts are buckled against a normal convertible forward driving direction in such a manner that an upper section of the adjoining backrest or of the headrest of the front seat can project into the clearance of the bar section.

14. Wind deflecting device according to claim 12, wherein the lateral parts are buckled against the normal vehicle forward driving direction in such a manner that an upper section of the adjoining backrest or of the headrest of the front seat can project into the clearance of the bar section.

15. A wind deflecting assembly according to claim 11, wherein the lateral parts are fixed on the rollover bar by means of VELCRO fasteners.

16. Wind deflecting device according to claim 1, wherein a bordering frame is provided along the two laterally extending edges of the pane.

17. A wind deflecting assembly for a convertible having a rollover bar disposed behind vehicle seats and exhibiting a laterally extending central section adjoining upwardly protruding curved sections to thereby form an upwardly open cut-out bounded on the bottom by the central section and on lateral edges by respective inner sides of the curved sections, said wind deflecting assembly comprising:

a center part insertable into the cutout to be supported at the center section and the inner sides of the curved sections.

18. A wind deflecting assembly according to claim 17, wherein the center part is formed by a transparent, standingly arranged pane made of plastic which is held in position on the rollover bar by at least one of a plug-type connection and detent connection.

19. A wind deflecting assembly according to claim 18, wherein the center part is constructed so it can be manually removed.

20. A wind deflecting assembly according to claim 18, wherein the upper transversely extending edge of the pane has a frameless construction.

21. A wind deflecting assembly according to claim 17, wherein the center part is constructed so it can be manually removed.

22. A wind deflecting assembly according to claim 17, wherein the curved sections define openings, further comprising lateral parts insertable in the openings of the curved sections.

* * * * *